US 7,236,310 B2

(12) United States Patent
Weber et al.

(10) Patent No.: US 7,236,310 B2
(45) Date of Patent: Jun. 26, 2007

(54) DEVICE FOR EQUALIZING THE BACK FOCI OF OBJECTIVE AND CAMERA

(75) Inventors: Uwe Weber, Aalen (DE); Gebhard Müller, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 321 days.

(21) Appl. No.: 10/405,682

(22) Filed: Apr. 1, 2003

(65) Prior Publication Data
US 2004/0051965 A1    Mar. 18, 2004

(30) Foreign Application Priority Data
Sep. 13, 2002   (DE) ................. 102 42 722

(51) Int. Cl.
*G02B 15/14*   (2006.01)
*G02B 7/02*    (2006.01)
(52) U.S. Cl. .............. 359/694; 359/699; 359/704; 359/819; 359/823
(58) Field of Classification Search ............. 359/823, 359/818, 819, 820, 821, 822, 827, 694, 698, 359/699, 703, 704
See application file for complete search history.

(56) References Cited
U.S. PATENT DOCUMENTS 3,879,113 A  *  4/1975  Howland et al. ............ 351/206
4,199,220 A  *  4/1980  Casagrande ................. 359/505
4,255,029 A  *  3/1981  Freudenschuss ............ 396/104
5,889,555 A  *  3/1999  Kawase et al. ............. 348/336
6,404,939 B1    6/2002  Wada

FOREIGN PATENT DOCUMENTS

GB         2 259 373 A     10/1993

OTHER PUBLICATIONS

German Office Action dated Feb. 2005 (translation attached).

* cited by examiner

*Primary Examiner*—Scott J. Sugarman
*Assistant Examiner*—Brandi Thomas
(74) *Attorney, Agent, or Firm*—Walter Ottesen

(57) ABSTRACT

A device for adjusting the back foci of an objective and a camera to one another has a housing by which a graphic pattern and an optics are mounted at a predetermined distance F' from each other. The temperature compensation for the distance F' is constant to ±2 mm for a temperature change of Delta 20° Celsius. The device also includes an apparatus for matching the back foci of an objective and a camera to each other, in which a housing has a fastening mechanism for fastening an object-side end of the objective and a graphic pattern is arranged in the housing on the end of the device opposite the fastening mechanism. The invention also includes a method for equalizing the back foci of an objective and camera using specific steps.

27 Claims, 4 Drawing Sheets

DEVICE FOR EQUALIZING THE BACK FOCI OF OBJECTIVE AND CAMERA

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

A new series of objectives under the name "Digiprime" has been offered by the Zeiss company. The objectives are for high definition digital cameras. Such cameras are offered, for example, by the Sony or Panasonic companies.

An essential difference from the objectives for film cameras heretofore consists of the possibility of changing the image-side intercept distance (termed "back focus" in English) of the objective by means of a rotary ring. This is necessary because the tolerance for the back focus within the camera is large in comparison with a film camera. Moreover, the objective holder in the camera is as a rule made of aluminum, and greater wear can be expected. Such an adjustment can of course be achieved in that the back focus of the camera is changed, or a back focus change takes place by means of an intermediate ring inserted between objective and camera.

The adjustment to the correct back focus must take place very accurately, since a faulty setting results in out of focus pictures.

Methods are described hereinafter which are up to now known for matching the back focus of the objective to the back focus of the camera.

In methods used in practice up to now, a Siemens star printed on cardboard is imaged from a distance of 1–2 m by means of the camera, which is provided with a corresponding objective. The distance of the Siemens star from the objective or the camera is measured with a tape measure. The image of the Siemens star obtained with the camera is assessed. For adjustment, the image is made sharp by turning the back focus adjusting ring. The image can be observed during this adjustment by means of the viewfinder, or else by an external control monitor.

SUMMARY OF THE INVENTION

The invention has as its object to be able to comfortably carry out the equalization of the back foci of objective and camera.

The object is attained by a device for adjusting the back foci of an objective and a camera to one another, wherein the device has a housing by which a graphic pattern and an optics are mounted at a predetermined distance (F') from each other. The object is also attained by a device wherein by the temperature compensation the distance F' is constant to ±2 mm for a temperature change of Delta 20° Celsius.

By the measure of providing a device by means of which a graphic pattern is provided at a predetermined distance, it is possible to be able to comfortably perform the equalization of the back foci by making use of this graphic pattern.

In particular, a Siemens star has been found to be suitable as the graphic pattern.

A device, preferably a clamping device, has furthermore been found to be advantageous for fastening the device to the objective, so that no separate holder is required for the device.

A temperature compensation has furthermore been found to be advantageous. The temperature compensation ensures that the graphic pattern is sharply imaged at a predetermined distance over a large temperature range, such as e.g. −10° C. to 50° C., or 20° C. to 70° C.

It has furthermore been found to be advantageous to illuminate the graphic pattern by means of an illuminating arrangement.

An advantageous development of the device is to construct the device in modules, so that the ability of the device to function can be quickly restored by changing individual modules when there is a defect. Furthermore, by interchanging individual modules it is possible to change the properties of the device. Thus, for example, the distance at which the graphic pattern is imaged, or the graphic pattern itself, can be changed.

Further advantageous measures are described in the further claims. An embodiment example is described in detail using the accompanying Figures, and the temperature compensation is explained in detail using the sketch in FIG. 4.

DETAILED DESCRIPTION OF THE INVENTION

Figure 1:
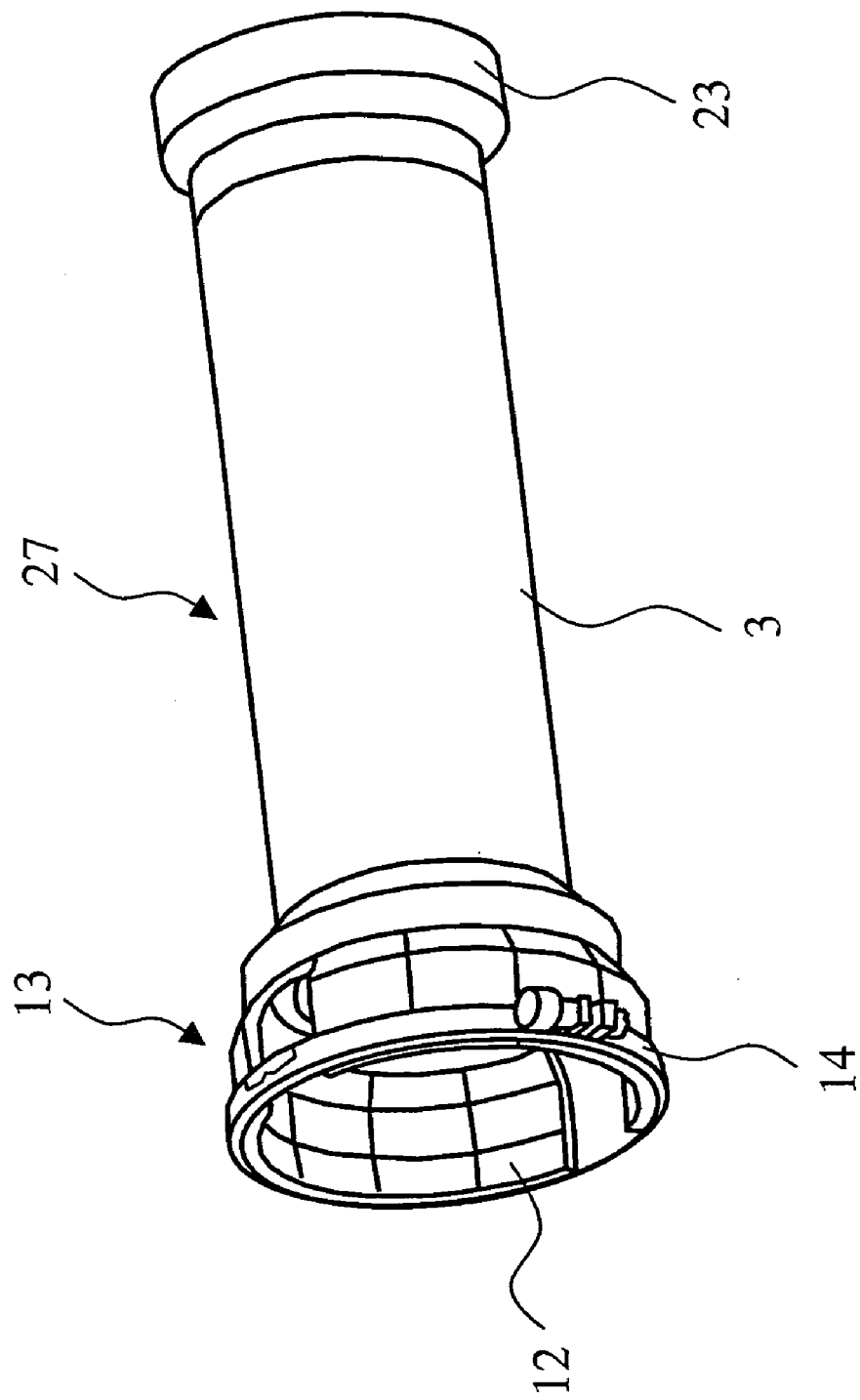
FIG. 1 shows a device for equalizing the back foci of objective and camera, in side view.

FIG. 1 shows an external view of a device according to the invention. The device 1 includes a clamping device 13 with a tightening ring 14 which coaxially surrounds clamp jaws 12. This clamping device represents one of the modules included in the device. The device can be frictionally connected to the objective of a camera by means of the clamping device. Alternatively, a positive connection such as screws or a latch connection can be provided.

Further modules, which can be seen in FIG. 1, are the image module 23 and the middle module 27 with the housing 3.

Figure 2:
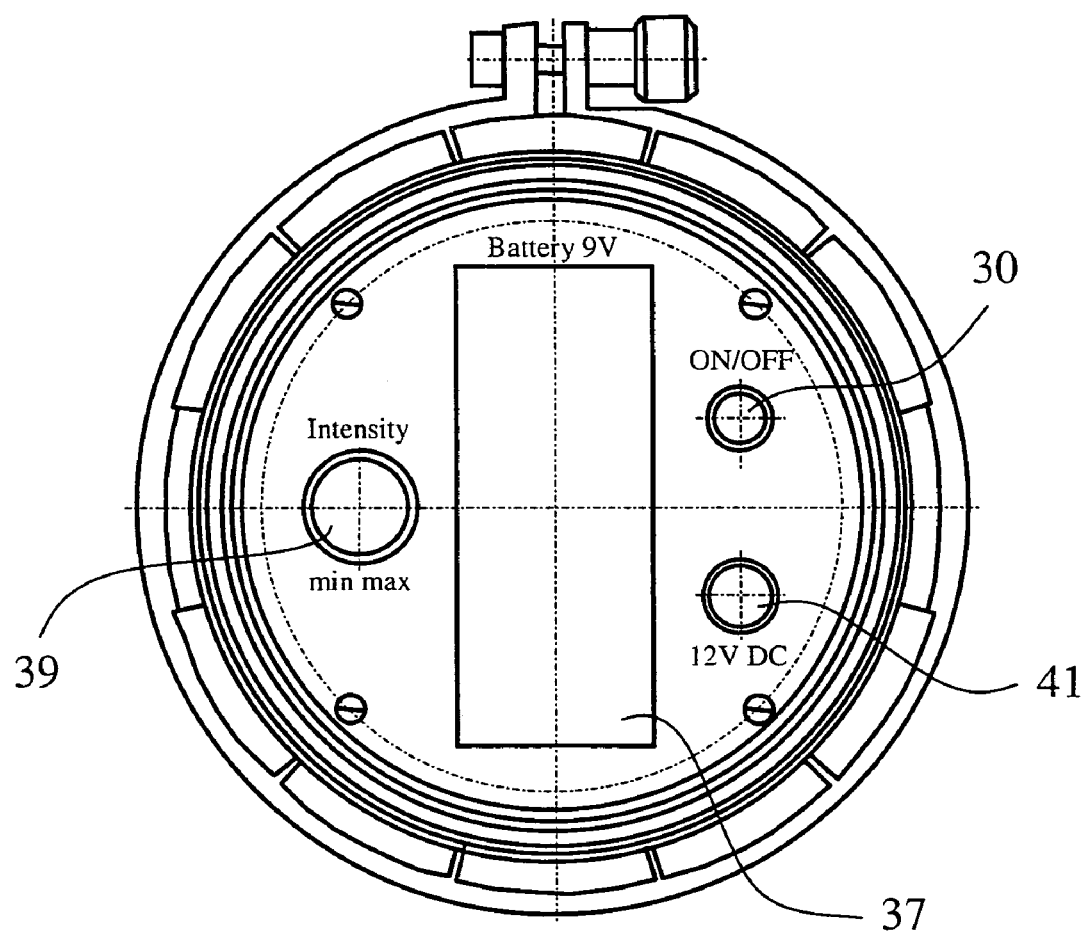
FIG. 2 shows a back view of the device of FIG. 1.

FIG. 2 shows a plan view of the end situated opposite to the clamping device.

Arranged at this end are a on/off switch 30, a plug connection 41 for an external current supply, and a brightness control 39 for an illumination arrangement provided within the device, and the battery compartment 37. The current supply can also be used for charging the battery.

Figure 3:
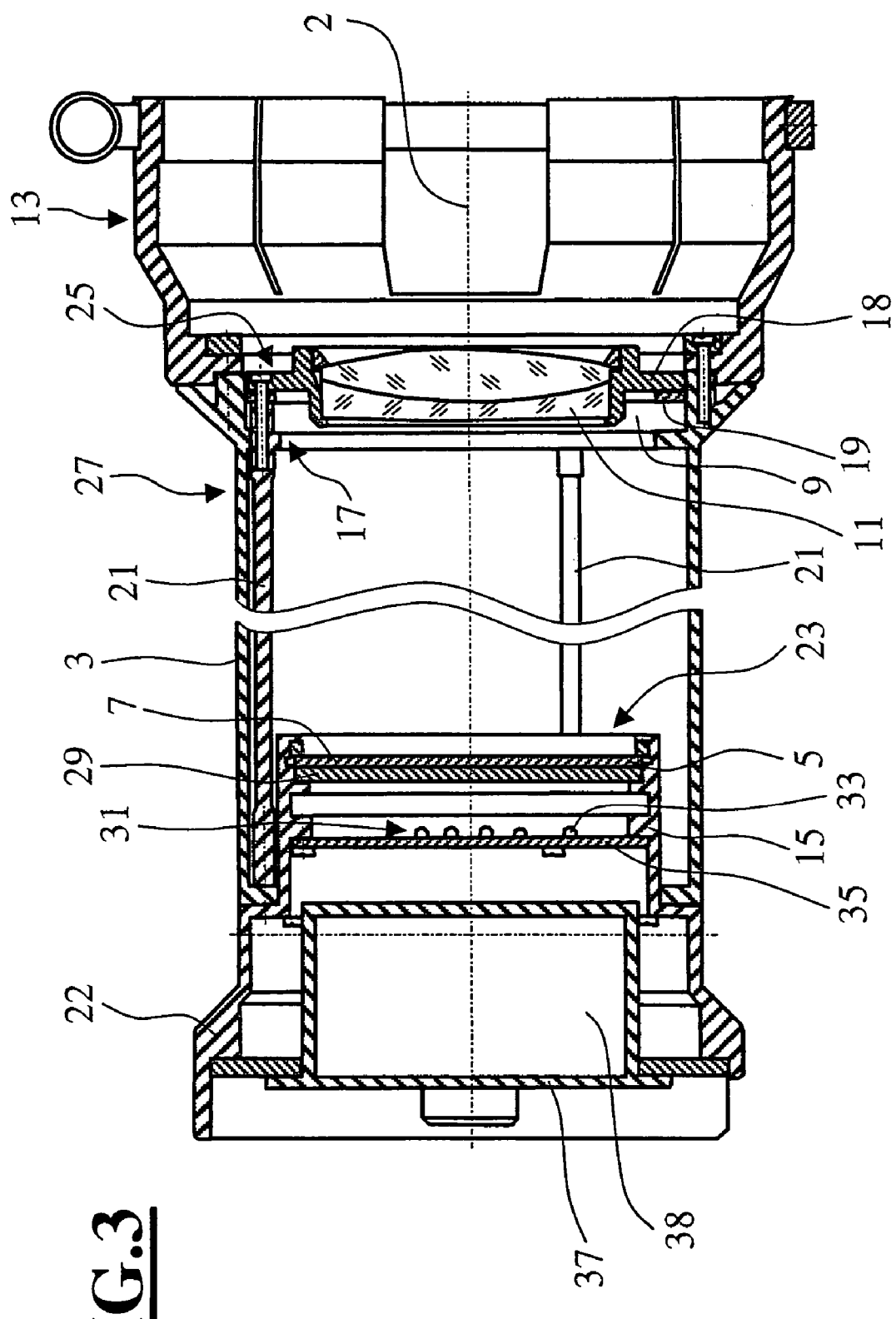
FIG. 3 shows a section through the device shown in FIG. 1.

FIG. 3 shows a section through the device 1 along the optical axis 2. The battery compartment 37 with the battery 38 is constituted in the housing 22 of the image module 23. A control device 35 in the form of a circuit board 35' is arranged behind the battery. This control device 35 is in signal connection with the on/off switch 30 and with the brightness control 39. This control device 35 is furthermore in signal connection with LEDs for an illumination of the Siemens star 7 provided as the graphic pattern 5. These LEDs are advantageously arranged directly on the circuit board 35'. Another lighting source can of course be provided as the illumination arrangement.

A matt plate 29 is provided between the circuit board 35' and Siemens star 7, for the uniform illumination of the Siemens star. By the use of such a graphic pattern, good illumination can be provided by means of transmitted light illumination, without reflections occurring. Another kind of illumination can however be selected. Furthermore an illumination is not required when an illumination of the graphic pattern is provided by directly incident radiation by means of daylight. Furthermore it is also possible to provide an illumination of the graphic pattern by means of luminescent material, such as is known from the field of target telescopes for providing an illuminated target marking.

A first holder 15 is formed as a portion of the housing 22 for mounting the Siemens star.

The housing 22 is fastened to the housing 3 of the middle module 27. The holder projects into the housing 3 of the middle portion 27.

Rods 21 are furthermore fastened to the housing 3 of the middle portion 27 and are a portion of a second holder 17. These rods are made from a material other than the first holder 17 and a mount 18 in which an optics 9 is mounted. An achromat 11 is provided as the optics 9, and images the Siemens star 7 at infinity. However it can also be provided that the graphic pattern 5 is imaged to another distance.

Arranged between the rods 21 and the mount 18 are distance plates 19, by means of which the basic distance between the graphic pattern 5 and the optics 9 can be changed.

The functional principle of the device 1 is described hereinbelow.

By means of the device 1, the illuminated Siemens star 7 is imaged to ∞ by means of the achromat 11. The device 1 is set directly on the objective to be adjusted (not shown) by means of the clamping device 13.

In principle, the distance ring of the objective is set to the distance at which the graphic pattern 5 is imaged by the optics 9. Here the focusing ring of the camera is thus set to ∞. The Siemens star/graphic pattern can be observed in the viewfinder of the camera and can be set sharply by turning the back focus adjusting ring of the objective of the camera.

Further general advantages of the device are: The device 1 is directly pushed from the front onto the objective. No additional support is necessary. The clamping device 13 at the mechanical interface with the objective ensures additional holding.

A Siemens star 7 on cardboard and a corresponding illumination arrangement 31 are not necessary. The device 1 can also be used in the dark because of its integrated battery-operated illumination arrangement 33. Alternatively, the device 1 can also be operated by means of an external current supply via the plug connection 41. To protect the battery 38 from inadvertent discharge, the illumination arrangement 31 switches off after 0.5–10 min (adjustable).

The distance measurement to the Siemens star 7 is omitted.

The brightness of the Siemens star 7 in the viewfinder can easily be adjusted with a control 39.

Errors in distance adjustment are not present, since it is easy to turn to the ∞ stop, with a selected imaging at infinity by the optics 9.

The clamping device 13 can be unscrewed. Clamping devices are obtainable in different diameters. Due to this, the device can also be adapted to objectives of different producers and thus can be used universally.

An increase in accuracy can be attained, above all with objectives of longer focal lengths. If 5 μm is set as a permissible focusing error, the following values result for the required measuring accuracy of the distance to the graphic pattern:

| | |
|---|---|
| Focal length of objective: | 40 mm |
| Distance from Siemens star: | 1 m or 2 m |
| Permissible error of distance measurement with tape measure: | 0.2% or 0.6% |

The required accuracy cannot be reliably attained with a commercial tape measure.

The basic principle of a temperature-controlled device 1 for equalizing the back focus of objective and camera is described hereinbelow using FIG. 4.

The focal length F', which corresponds to the distance between the main plane 55 of the achromat 11 and the Siemens star 7, is to be kept constant over a wide temperature range, in order to ensure the imaging of the Siemens star 7 at infinity in every case.

Figure 4:
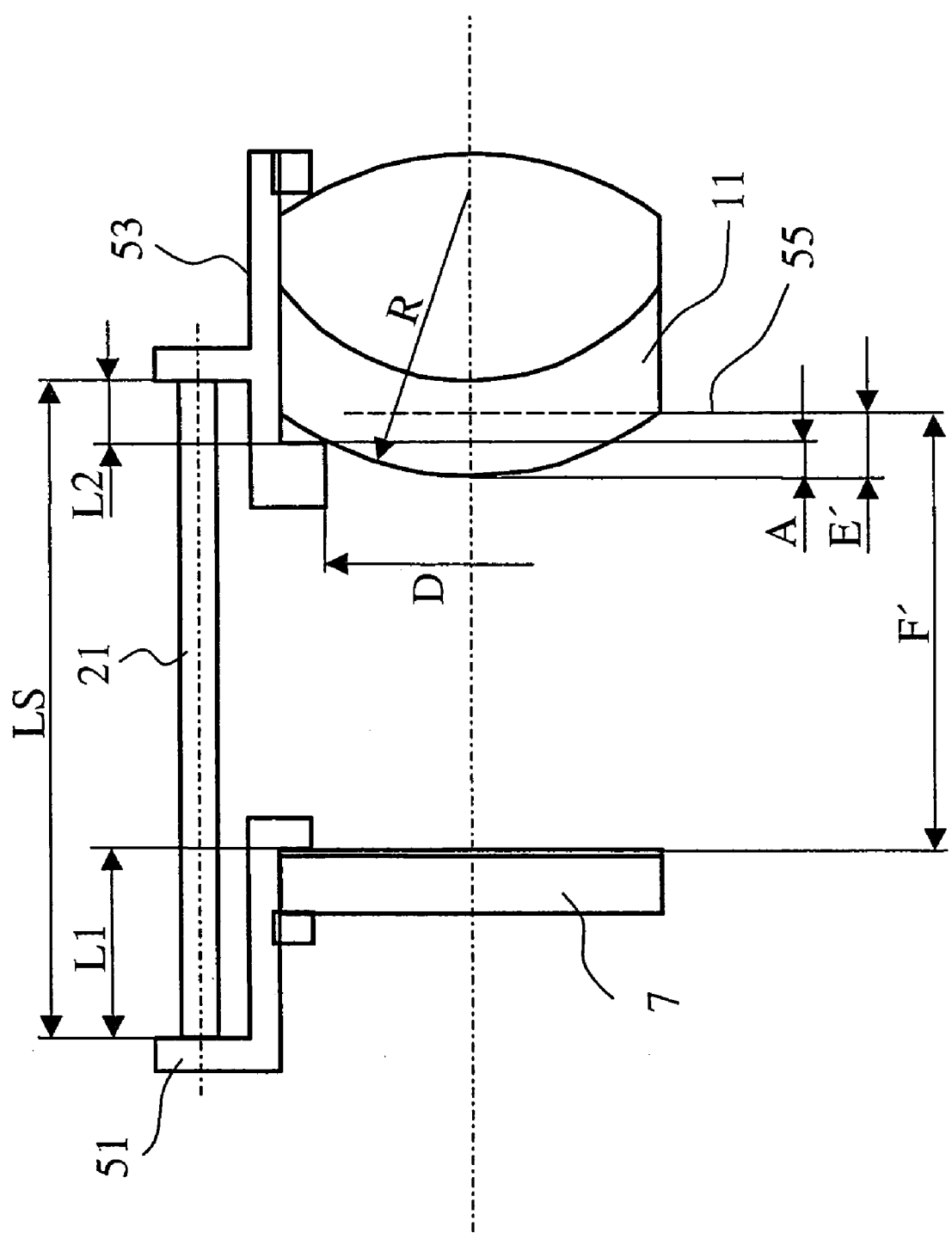
FIG. 4 shows a diagram of the basic principle of a temperature compensated device for equalization of the back foci of objective and camera.

For this purpose, the rods 21 (only two rods are shown in FIG. 4) consist of a material with small thermal expansion coefficients. These rods act against the short mounts 51, 53, which consist of a material with large thermal expansion coefficients. If the differences of the thermal expansion coefficients are too similar, this would lead to a large structure.

The geometrical and optical changes of the achromat with the course of temperature, that is, when the temperature changes, are also to be considered in the calculation. The aim is a total compensation of all expansions and of the optical property of the achromat.

| Parameters |
|---|
| L1 Effective length of mount 1, of material 1 with thermal expansion coefficient α1 |
| L2 Effective length of mount 2, of material 2 with thermal expansion coefficient α2 |
| L3 length of the rod, of material S with thermal expansion coefficient of the rod αS |
| F' focal length of the achromat |
| E' principal point back focus of the achromat |
| R salient radius of the achromat |
| D support diameter of the achromat |
| A distance of the vertex point of the achromat to the support point |

Basic Formulae

For all temperatures, the following is to hold:

$$F'-E'+A+L2-LS+L1=0$$

Thus:

$$\Delta F'-\Delta E'+\Delta A+\Delta L2-\Delta LS+\Delta L1=0$$

A is given by:

$$A = R - \sqrt{\left(R^2 - \frac{D^2}{4}\right)}$$

Simplified Assumptions

The material of the two mounts 51, 53 for achromat and Siemens star consist of the same material F with thermal expansion coefficient $\alpha F=\alpha 1=\alpha 2$. This assumption certainly holds for most applications of this kind, since a standard material is usually used.

Thus there holds for the effective total length of both mounts:

$$LF=L1+L2$$

Predetermined Values

For F', E' and A, there are calculated values for given temperatures. The changes $\Delta F'$, $\Delta E'$ and $\Delta A$ can be calculated from these. A system-specific value can be derived from these values:

$$S=F'-E'+A$$

and:

$$\Delta S=\Delta F'-\Delta E'+\Delta A$$

Calculation

The following simplified formulae result from the simplified assumptions and the predetermined values:

$$\Delta S+\Delta LF-\Delta LS=0$$

$$\Delta S+LF*\Delta T*\alpha F-LS*\Delta T*\alpha S=0$$

Rearranged formula:

$$LS*\alpha S-LF*\Delta F=\Delta S/\Delta T$$

$$LF=LS-S$$

From this there follows:

$$LS*\alpha S-LS*\alpha F+S*\alpha F=\Delta S/\Delta T$$

Thus there holds for the length of the rods:

$$LS=(\Delta S/\Delta T-S \cdot \alpha F)/(\alpha S-\alpha F)$$

Particularly suitable materials:

As materials for this structure there may be considered:

For the mounts (as large a thermal expansion coefficient as possible):

Steel (10.3E-6/° K.), brass (21.1E-6/° K.), aluminum (24E-6/° K.), plastics (with large For the rods (smallest possible temperature coefficient):

Zerodur glass ceramic (0), Invar (1.5–2.5-E-6/° K. according to heat treatment), plastics (there are a few a highly filled plastics with about 2.5E-6/° Kelvin), ceramics (with small $\alpha$).

Aluminum for the mounts and Invar for the rods has been found to be a good combination, since the components are easily and conveniently produced and the thermal expansion coefficients are situated sufficiently far apart.

Exemplary calculations have shown that the temperature course of the optics (geometric and optical) has only a small effect on the precision of the device. On the other hand, a temperature course can have a marked effect on the distance of the optics and the graphic pattern. For this reason a temperature compensation of the device can be provided by the selection of suitable materials for the rods and the mounts and a specific coordination of length.

For example, a device constructed in this manner with an achromat with a focal length of 200 mm to the Siemens star could be thermally stabilized so that with $\Delta T=20°$ K., a position change of the Siemens star of 0.01 mm could be attained.

| Reference List | |
|---|---|
| 1 | device |
| 2 | optical axis |
| 3 | housing |
| 5 | graphic pattern |
| 7 | Siemens star |
| 9 | optics |
| 11 | achromat |
| 12 | clamp jaws |
| 13 | clamping device |
| 14 | stress ring |
| 15 | holder |
| 17 | second holder |
| 18 | mount |
| 19 | distance plate |
| 21 | rods |
| 22 | housing of the image module |
| 23 | image module |
| 27 | middle module |
| 29 | matt disk |
| 30 | on/off switch |
| 33 | battery-operated illumination (LED) |
| 35 | control device |
| 35' | circuit board |
| 36 | plate |
| 37 | battery compartment |
| 38 | battery |
| 39 | brightness control |
| 41 | plug connection |
| 51 | mount |
| 53 | mount |
| 55 | principal plane |

What is claimed is:

1. Device for adjusting the back foci of an objective and a camera to one another, wherein the device has a housing by which a graphic pattern and an optics are mounted at a predetermined distance (F') from each other; and, a temperature compensation for ensuring a sharp imaging of the graphic pattern over a large temperature range, preferably from $-10°$ C. to $+15°$ C., can be ensured.

2. Device according to claim 1, wherein the graphic pattern is mounted by a first holder of a first material, and the optics is mounted by a second holder which consists at least partially of another material.

3. Device according to claim 1, wherein the first holder and the second holder have an extension parallel to the optical axis established by the optics.

4. Device according to claim 1, wherein the first holder and the second holder are arranged coaxially of one another.

5. Device according to claim 1, wherein the second holder includes rods or a tube, which consists of a second material.

6. Device for adjusting the back foci of an objective and a camera to one another, wherein the device has a housing by which a graphic pattern and an optics are mounted at a predetermined distance (F') from each other; and, wherein by means of the temperature compensation, the distance F' is constant to ±2 mm for a temperature change of $\Delta T=20°$ Celsius.

7. A device for adjusting the back foci of an objective and a camera to one another, wherein the device has a housing by which a graphic pattern and an optics are mounted at a predetermined distance (F') from each other;

wherein a temperature compensation for ensuring a sharp imaging of said graphic pattern over a large temperature range, preferably from −10 degrees C. to 15 degrees C., is aimed at by a structure comprising:
mounts for said graphic pattern and said optics wherein said mounts are made of a material with a large thermal expansion coefficient;
and rods or a tube, which are arranged between said mounts, wherein said rods or said tube are made of a material with a small thermal expansion coefficient, and with this ensuring a constant focal length F' which corresponds to the distance between said main plane of said optics and said graphic pattern.

8. Device according to claim 7, wherein said mounts are made of a material selected from the group consisting of steel, brass, aluminum and plastics, and wherein the rods or tube are made of a material selected from the group consisting of Zerodur glass ceramic, Invar, ceramics, and plastics.

9. A device for adjusting the back foci of an objective and a camera to one another, the camera and objective conjointly defining a camera assembly with said objective having an object end facing away from said camera, said device comprising:
a housing defining an axis and being mountable on said object end of said objective;
a graphic pattern disposed on said axis;
an optic arranged on said axis for imaging said graphic pattern;
said graphic Pattern and said optic being mounted at a predetermined distance (F') from each other;
structure in said housing for supporting said graphic pattern and said optic so as to thermally stabilize said predetermined distance (F'); and
wherein the thermal stabilization ensures a sharp imaging of said graphic pattern over a large temperature range.

10. The device according to claim 9, wherein the distance (F') is such that the graphic pattern is imaged at a predetermined distance, preferably at infinity.

11. The device at least according to claim 9, wherein the graphic pattern is a Siemens star.

12. The device at least according to claim 9, wherein an achromat is provided as the optics.

13. The device according to claim 9, wherein the device consists of interchangeable modules.

14. The device according to claim 9, wherein an illumination arrangement is provided for illuminating the graphic pattern.

15. The device according to claim 14, wherein a switch is provided for adjusting the brightness of the illumination.

16. The device of claim 9, further comprising a fastening mechanism for frictionally connecting said housing to said object end of said objective.

17. The device of claim 16, wherein said fastening mechanism is a clamping device.

18. The device of claim 16, wherein said fastening mechanism is a positive connection including screws or a latch connection.

19. The device of claim 9, wherein said temperature range is −20° C. to +70° C.

20. The device of claim 9, wherein said temperature range is −10° C. to +50° C.

21. The device of claim 9, wherein said temperature range is −10° C. to +15° C.

22. The device of claim 9, said structure comprising a first holder for supporting said graphic pattern and a second holder for supporting said optic; and, said first holder being made of a first material and said second holder being made at least partially of a second material.

23. The device of claim 22, wherein said optic defines an optical axis and said first holder and said second holder conjointly define an extension parallel to said optical axis.

24. The device of claim 23, wherein said first holder and said second holder are arranged coaxially to each other.

25. The device of claim 22, wherein said first holder is made of a first material and said second holder includes a tube made of a second material.

26. A device for adjusting the back foci of an objective and a camera to one another, the camera and objective conjointly defining a camera assembly with said objective having an object end facing away from said camera, said device comprising:
a housing defining an axis and being mountable on said object end of said objective;
a graphic pattern disposed on said axis;
an optic arranged on said axis for imaging said graphic pattern;
said graphic pattern and said optic being mounted at a predetermined distance (F') from each other;
structure in said housing for supporting said graphic pattern and said optic so as to thermally stabilize said predetermined distance (F'); and,
wherein the thermal stabilization ensures that said predetermined distance (F') is constant to ±2 mm for a temperature change of 20° C.

27. A device for adjusting the back foci of an objective and a camera to one another, the camera and objective conjointly defining a camera assembly with said objective having an object end facing away from said camera, said device comprising:
a housing defining an axis and being mountable on said object end of said objective;
a graphic pattern disposed on said axis;
an optic arranged on said axis for imaging said graphic pattern;
said graphic pattern and said optic being mounted at a predetermined distance (F') from each other;
structure in said housing for supporting said graphic pattern and said optic so as to thermally stabilize said predetermined distance (F'); and,
wherein the thermal stabilization ensures that said predetermined distance (F') is constant to <0.01 mm for a temperature change of 20° C.

* * * * *

UNITED STATES PATENT AND TRADEMARK OFFICE
CERTIFICATE OF CORRECTION

PATENT NO. : 7,236,310 B2
APPLICATION NO. : 10/405682
DATED : June 26, 2007
INVENTOR(S) : Uwe Weber and Gebhard Mueller It is certified that error appears in the above-identified patent and that said Letters Patent is hereby corrected as shown below:

Column 5
Line 32: delete "LS*αS–LF*ΔF=ΔS/ΔT" and insert -- LS*αS–LF*αF=ΔS/ΔT -- therefor.

Line 47: insert -- α) . -- after "large".

Line 49: delete "(1.5–2.5–E–6/° K." and insert -- (1.5–2.5E–6/° K -- therefor.

Column 7:
Line 28: delete "Pattern" and insert -- pattern -- therefor.

Signed and Sealed this

Eleventh Day of December, 2007

JON W. DUDAS
*Director of the United States Patent and Trademark Office*